(12) United States Patent
Ganapathy et al.

(10) Patent No.: US 9,603,071 B2
(45) Date of Patent: Mar. 21, 2017

(54) COMMUNICATION SYSTEM (71) Applicants: Suresh Ganapathy, Tokyo (JP); Jagdeep Singh Ahluwalia, Tokyo (JP); Neeraj Gupta, Tokyo (JP); Kenji Kawaguchi, Tokyo (JP)

(72) Inventors: Suresh Ganapathy, Tokyo (JP); Jagdeep Singh Ahluwalia, Tokyo (JP); Neeraj Gupta, Tokyo (JP); Kenji Kawaguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 219 days.

(21) Appl. No.: 14/362,593

(22) PCT Filed: Nov. 15, 2012

(86) PCT No.: PCT/JP2012/080255
§ 371 (c)(1),
(2) Date: Jun. 3, 2014

(87) PCT Pub. No.: WO2013/084723
PCT Pub. Date: Jun. 13, 2013

(65) Prior Publication Data
US 2014/0349649 A1 Nov. 27, 2014

(30) Foreign Application Priority Data
Dec. 6, 2011 (GB) .................................. 1120963.2

(51) Int. Cl.
*H04B 1/38* (2015.01)
*H04W 36/00* (2009.01)
(Continued)

(52) U.S. Cl.
CPC ............. *H04W 36/06* (2013.01); *H04W 8/02* (2013.01); *H04W 36/0022* (2013.01);
(Continued)

(58) Field of Classification Search
CPC ........................... H04W 84/045; H04W 24/02
(Continued)

(56) References Cited

U.S. PATENT DOCUMENTS

2009/0253426 A1* 10/2009 Qiu ........................ H04W 92/20
455/426.1
2010/0227611 A1 9/2010 Schmidt et al.
(Continued)

FOREIGN PATENT DOCUMENTS

WO WO 2009/108183 A1 9/2009
WO WO 2010/006203 A2 1/2010
(Continued)

OTHER PUBLICATIONS

Russian Office Action dated Dec. 1, 2015 with English translation.
(Continued)

*Primary Examiner* — Dung Hong
(74) *Attorney, Agent, or Firm* — McGinn IP Law Group, PLLC (57) ABSTRACT

A communication system in which a transferring unit are configured for transferring at least one information element from a first base station to a second base station. In one embodiment, the information element is sent internally to a communication apparatus including the first and second base stations or externally via a communication node external to the apparatus. In one embodiment, the information element is sent between the two base stations via a communication node of a communication network.

12 Claims, 8 Drawing Sheets

(51) Int. Cl.
| | |
|---|---|
| *H04W 40/00* | (2009.01) |
| *H04W 72/00* | (2009.01) |
| *H04W 36/06* | (2009.01) |
| *H04W 8/02* | (2009.01) |
| *H04W 88/10* | (2009.01) |
| *H04W 84/04* | (2009.01) |
| *H04W 92/20* | (2009.01) |

(52) U.S. Cl.
CPC ...... *H04W 36/0055* (2013.01); *H04W 84/045* (2013.01); *H04W 88/10* (2013.01); *H04W 92/20* (2013.01)

(58) Field of Classification Search
USPC .............. 455/422.1, 436, 443–446, 453, 561
See application file for complete search history.

(56) References Cited

U.S. PATENT DOCUMENTS

| | | | |
|---|---|---|---|
| 2010/0279689 A1* | 11/2010 | Tinnakornsrisuphap | H04W 84/045 455/435.2 |
| 2011/0053598 A1* | 3/2011 | Ahluwalia ............ | H04W 36/22 455/436 |
| 2012/0015683 A1* | 1/2012 | Gao ........................ | H04W 8/26 455/524 |
| 2014/0050086 A1* | 2/2014 | Himayat ............ | H04N 21/2365 370/230 |

FOREIGN PATENT DOCUMENTS

| | | |
|---|---|---|
| WO | WO 2010/127333 A1 | 4/2010 |
| WO | WO 2010/085191 A1 | 7/2010 |
| WO | WO 2011/009415 A1 | 1/2011 |
| WO | WO 2011/158663 A1 | 12/2011 |

OTHER PUBLICATIONS

Japanese Office Action dated May 20, 2015 with partial English Translation.
Russian Office Action dated Mar. 30, 2016 with an English translation.
International Search Report in PCT/JP2012/080255 dated Jul. 3, 203 (English Translation Thereof).
3 GPPP TS 36.300 v9.6.0 (Dec. 2010) 3rd Generation Partnership Project; Technical Specification Group Radio Access Network; Evolved Universal Terrestrial Radio Access (E-UTRA); and Evolved Universal Terrestrial Radio Access Network (E-UTRAN); Overall description (Release 9).
3 GPP TS 36.413 v10.3.0 (Sep. 2011) $3^{rd}$ Generation Partnership Project; Technical Specification Group Radio Access Network; Evolved Universal Terrestrial Radio Access Network (E-UTRAN);S1 Application Protocol (S1AP) (Release 10).
3 GPP TS 48.018 v10.3.0 (Sep. 2011) 3rd Generation Partnership Project; Technical Specification Group GSM/EDGE Radio Access Network; General Packet Radio Service (GPRS);Base Station System (BSS)—Serving GPRS Support Node (SGSN);BSS GPRS Protocol (BSSGP)(Release 10).

* cited by examiner

COMMUNICATION SYSTEM

TECHNICAL FIELD

The present invention relates to mobile telecommunication networks and to parts thereof, particularly but not exclusively, networks operating according to the 3rd Generation Partnership Project (3 GPP) standards or equivalents or derivatives thereof. The invention has particular although not exclusive relevance to the exchange of information elements between home base stations in these networks.

BACKGROUND ART

Under the 3GPP standards, a NodeB (or an eNB in LTE (i.e. Long Term Evolution)) is the base station module via which mobile devices connect to the core network and which defines a cell of the network. Home base stations or base station modules (HNB) provide short range 3G radiofrequency (RF) coverage, and are sometimes referred to as femto access points (FAP). Where the home base station is operating in accordance with the LTE standards, the HNB is commonly referred to as an HeNB. Some base stations, sometimes referred to as HNB/HeNB, can operate in accordance with both the 3G and LTE standards, and therefore define a dual mode femtocell. The HNB/HeNB base station may also sometimes be referred to as a dual mode femto access point (FAP) or dual FAP.

The HNB or HeNB provides radio coverage (for example, 3G, 4G and/or WiMAX) within the home, small or medium enterprise, shopping malls, etc. and typically connects to the core network via a suitable residential gateway RG and public or corporate broadband (BB) access network (for example via an ADSL link to the Internet). The HNB or HeNB is given an IP address by the local network to which it is connected, and the HNB or HeNB provides this IP address to the mobile telephone operator network so that it can reserve appropriate resources for the HNB or HeNB through the broadband access network.

During operation in a normal operation mode or normal state, the HNB or HeNB enables users of a User Equipment (UE) to communicate with other such users via one of a number of the base stations (eNodeB, eNB) and a core network.

In a connected or active state or mode, a UE is registered with the network and has an RRC (Radio Resource Control) connection with a base station, so that the network can identify which cell the UE belongs to and can transmit data to and receive data from the UE. In LTE, in the active state or mode, the Handover procedure allows UEs to have service continuity while moving within the Intra LTE system (Intra RAT and Inter Frequency) and towards other RATS (Radio Access Technologies).

A UE also has a power conservation or idle state or mode in which, typically, the UE is not transmitting or receiving data, and no context about the UE is stored by the base station. In the idle state, the location of the UE is known only (to the MME (Mobility Management Entity) in 3GPP) at the granularity of a Tracking Area (TA) comprising a cluster or group of base station cells. When in the idle state, a UE selects and reselects cells according to the parameters broadcast by the base station in the BCH (Broadcast Channel), with a frequency given by a Tracking Area Update Timer Value, and the base station is not aware of the cell selections/reselections made by the UE.

During the normal operation mode, the HNB or HeNB usually periodically broadcasts a downlink transmission comprising reference signals and system information, for instance both the Pilot and the Broadcast Channels, to signal its presence to UEs. Each HNB or HeNB also checks if there are any UEs in the idle or connected state in its cell. In order to allow the HNB or HeNB to perform this check, the periodic Tracking Area Update Timer Value may be sent to the HNB or HeNB through the Operations and Management (O&M) system. If no UE responds by performing the Tracking Area Update, the HNB or HeNB can assume that there is no idle state UE present in the cell. The HNB or HeNB may also perform a dummy paging for an idle state UE. If the HNB or HeNB does not receive a paging response from a UE, the HNB or HeNB can assume that there is no idle state UE present in the cell. If no connected or idle state UE is present in the cell for certain duration of time (as determined by an Idle Timer), the HNB or HeNB moves to the energy saving mode, in which it stops all downlink transmissions. However, if an energy saving mode timer expires or if the HNB or HeNB receives a paging or any other message on its S1 interface or TR069 interface (using protocol messages defined in TR 196 Data Model from Broad Band Forum) or if the HNB or HeNB detects an uplink transmission from a UE in a neighbouring cell, then the HNB or HeNB moves back to the normal operation mode, in which it starts downlink transmission again.

In dual mode cells, both the baseband and the radiofrequency processing hardware blocks of the HeNB are independent from the baseband and the radiofrequency processing hardware blocks of the HNB.

However, at least one of the base station modules of a dual mode FAP may need at least one information element from the other base station module. Typical but not limiting operating modes of a dual FAP in which at least one of the base station modules may need at least one information element from the other base station module include NMM information element updating, Handover and Circuit-Switched fallback (CSFB).

NMM Information Element Updating

The base station modules may comprise a Network Monitor Mode (NMM) module which is controlled by an application level software module (sometimes referred to as NMM Controller) and which is configured to operate in a Network Monitor Mode to scan and monitor neighbour cells of RAT such as 2G, 3G, LTE, etc. The scan of the neighbour cells comprises an identification of the neighbour cells and an update of a Neighbour Cell List which includes identification of the identified neighbour cells. The monitoring of the neighbour cells may comprise the measure of at least one of Physical Cell Identifier (PCI), a Primary Scrambling Code (PSC) and a carrier frequency of a neighbour cell.

In a dual FAP, the NMM may be operated by only one of the base station modules, or the two base station modules may not operate the NMM at the same time. Also, in case the base station module operating the NMM is a HeNB, the base station module may identify more neighbour cells than the HNB of the dual FAP, by virtue of the Automatic Neighbour Relation (ANR) procedures.

Therefore the NMM module of the base station module which operated the NMM may need to send the information elements corresponding to the results of NMM, such as the updated PCI, PSC, carrier frequency or Neighbour Cell List, to the other base station module. In some examples, the sending of the information elements might be done via a TR-069 Auto Configuration Server (ACS) over the network.

Circuit-Switched Fallback (CSFB)

The HeNB of the dual FAP relies on a packet-only radio access technology (RAT), and not a circuit-switched (CS)

technology which is traditionally used for phone calls. The HeNB may therefore need to perform a Circuit-Switched fallback (CSFB), as defined in 3GPP TS 36.300-v9.6.0, in order to make or receive calls. During the CSFB, the UE changes its RAT from LTE technology to a 2G (GSM) or 3G (UMTS) technology which supports circuit-switched services.

There are several CSFB options for a Circuit Switch fallback to UMTS or GSM. One of the CSFB options is a RRC Connection Release with Redirection with Sys Info information element (IE). In an example, if a HeNB needs to perform a CSFB according to this option, the HeNB needs the information element Sys Info of the HNB which will make or receive the call.

Handover

A Handover (HO) is a procedure which changes the serving cell of a UE in RRC_CONNECTED from a source base station module to a target base station module.

The source base station module makes a decision about initiating a handover based on a measurement report from the UE and Radio Resource Management (RRM) information. When a source base station module decides to perform a handover, the source base station module passes all necessary information elements to the target base station module (e.g. E-RAB attributes and RRC context), using signalling which comprises a handover request message. In return, the target base station module prepares the HO by sending all necessary information elements using signalling which comprises a handover request acknowledge to the source base station module. In a HO, Admission Control (AC) may be performed by the target base station module dependent on the received information from the source base station module, to increase the likelihood of a successful HO, if the resources can be granted by target base station module.

However, a source or target base station module can dynamically reselect and change at least one of a Physical Cell Identifier (PCI), a Primary Scrambling Code (PSC) and a carrier frequency. The other base station module of the dual FAP needs the information elements corresponding to the updated PCI, PSC, and carrier frequency so that the HO can happen and can be successful.

Furthermore, the decision about the grant of the resources by a target base station module may depend on information elements such as target cell parameters which may comprise at least one of a static parameter information element, and a dynamic parameter information element. The static parameter information element may comprise at least one of a maximum number of UE that the target base station module is configured to serve (sometimes referred to as Max-UEsServed), the maximum number of closed subscriber group (CSG) members that the target base station module is configured to serve (sometimes referred to as MaxC-SGMembers), the maximum number of non CSG members that the target base station module is configured to serve (sometimes referred to as MaxNonCSGMembers). The dynamic parameter information element may comprise at least one of a current number of CSG UE which are served by the target base station module, a current number of non CSG UE which are served by the target base station module, a congestion status of the target base station module, and a load status of the target base station module.

The exchange of the information elements in the examples above has drawbacks.

In the example of an NMM information element updating or in the example of a handover, an NMM may not be performed by a base station module to monitor immediately the reselection and change of at least one of the PCI, PSC and carrier frequency by the other base station module of the dual FAP. The delayed NMM may result in at least one of the base station not having updated information elements as regards to at least one of the PCI, PSC and carrier frequency of the other base station module of the dual FAP. Furthermore, the TR-069 ACS and the NMM module may not send immediately updated information elements to at least one of the base station module as regards to the NMM results. The delayed sending of the NMM results may result in at least one of the base station not having updated information elements as regards to the Neighbour Cell List, and at least one of the PCI, PSC and carrier frequency of neighbour base station modules.

A subsequent handover might therefore fail or might not occur because of the non updated information elements. Moreover, if a handover is initiated and fails because the information elements were not updated, the signalling from the source and target base station modules was an unnecessary signalling over the communications network which may have been detrimental to other signalling and was unnecessary energy consumption.

In the example of a CSFB, the HNB of the dual FAP sends the needed Sys Info to the HeNB via the core network, using signalling involving RIM (RAN (Radio Access Network) Information Management) procedure, as defined in 3GPP TS 36.300-v 9.6.0. This signalling may result in increased traffic towards the Core Network which might be detrimental to the quality of the other traffic to the Core Network and is energy consuming.

SUMMARY OF THE INVENTION

Aspects of the present invention address or at least ameliorate the above issue.

According to one aspect, the invention provides a communications apparatus comprising: a first base station module for providing wireless connectivity to a communications network to one or more mobile communications devices within range of the first base station module; a second base station module for providing wireless connectivity to a communications network to one or more mobile communications devices within range of the second base station module; and means for transferring, internally to said communication apparatus, at least one information element from one of the first and second base station modules to the other one of the first and second base station modules.

The transferring means may comprise an internal interface for coupling the first base station module and the second base station module.

At least one of the first and second base station modules may provide at least one information element to the transferring means, and the transferring means may comprise a memory to store the provided at least one information element. The other of the first and second base station modules may retrieve the provided at least one information element from the memory of the transferring means and/or the transferring means may provide the information element provided by the at least one of the first and second base station modules to the other of the first and second base station modules.

The transferring means may comprise an operation administration maintenance module comprising a memory.

At least one of the first and second base station modules may provide at least one information element to the other one of the first and second base station via the interface. At least one of the first and second base station modules may request at least one information element from the other one of the first and second base station via the interface. The interface may comprise an interface module which comprises at least one controller module for at least one of the first and second base station modules.

At least one of the first and second base station modules may provide at least one information element to the other one of the first and second base station via the interface, in response to a request from a controller module.

According to one aspect, the invention provides a communications apparatus comprising: a first base station module for providing wireless connectivity to a communications network to one or more mobile communications devices within range of the first base station module; a second base station module for providing wireless connectivity to a communications network to one or more mobile communications devices within range of the second base station module; and means for transferring at least one information element from one of the first and second base station modules to the other one of the first and second base station modules, wherein said transferring means comprises: means, provided in said first base station module, for generating and sending a request identifying at least one required information element to a communication node of said communication network; means, provided in said second base station module, for receiving said request from said communication node and for sending a response to said request comprising said requested at least one required information element; and means, provided in said first base station module, for receiving said response.

The communication node may comprise a node of a core network. The request and the response may comprise messages in accordance with a Self Organizing Network (SON) Transfer protocol. The messages in accordance with the Self Organizing Network (SON) Transfer protocol may comprise a SON Information Transfer message, and the at least one information element may be added to the SON Information Transfer message, as any one of: a SON Transfer Application Identity information element, or a SON Transfer Request Container information element, or a SON Transfer Response Container information element.

The at least one information element may comprise at least one of: a configuration of at least one of the first and second base station modules, a Physical Cell Identifier (PCI), a Primary Scrambling Code (PSC), a carrier frequency, a static parameter information element, a dynamic parameter information element, System Information, such as UMTS system information, and a neighbour cell list. The static parameter information element may comprise at least one of: a maximum number of UE that a base station module is configured to serve (MaxUEsServed), a maximum number of closed subscriber group (CSG) members that a base station module is configured to serve (MaxCSGMembers), a maximum number of non CSG members that a base station module is configured to serve (MaxNonCSGMembers). The dynamic parameter information element may comprise at least one of: a current number of CSG UE which are being served by a base station module, a current number of non CSG UE which are being served by a base station module, and a load or congestion status of a base station module.

The first base station module and the second base station module may be mounted within a common housing. The communications apparatus may comprise a dual mode femto access point. At least one of the first and second base station modules may comprise a HNB and the other of the first and second base station modules may comprise a HeNB.

The transferring means may be configured for transferring, internally to said communication apparatus said at least one information element or for transferring said at least one information element via a communication node of said communication network external to said communication apparatus in dependence on the at least one information element being transferred.

According to one aspect, the invention provides a communications apparatus comprising: a first base station module for providing wireless connectivity to a communications network to one or more mobile communications devices within range of the first base station module; means for transferring at least one information element from a second base station module, for providing wireless connectivity to a communications network to one or more mobile communications devices within range of the second base station module, to the first base station module, wherein said transferring means comprises: means, provided in said first base station module, for generating and sending a request identifying at least one required information element to a communication node of said communication network; and means, provided in said first base station module, for receiving a response to said request from the second base station module, the response comprising said requested at least one required information element.

The invention also provides a system for use in a telecommunications network, comprising one or more mobile communications devices and a communications apparatus according to some aspects of the invention.

According to one aspect, the invention provides a mobile communications device for use with a communications apparatus comprising: a first base station module for providing wireless connectivity to a communications network to one or more mobile communications devices within range of the first base station module; a second base station module for providing wireless connectivity to a communications network to one or more mobile communications devices within range of the second base station module; an interface for coupling the first base station module and the second base station module; wherein at least one of the first and second base station modules is configured to exchange, internally to said communication apparatus, at least one information element with the other one of the first and second base station modules via said interface, and wherein the mobile communications device is arranged to communicate a communications network via one of the first and second base station modules of the communications apparatus.

According to one aspect, the invention provides a method, performed in a telecommunications network, for facilitating exchange of at least one information element between two base station modules of a communications apparatus, the method comprising exchanging at least one information element, over an internal interface coupling the two base station modules.

According to another aspect, the invention provides a method, performed in a telecommunications network, for facilitating exchange of at least one information element between two base station modules of a communications apparatus, the method comprising exchanging at least one information element via transferring means comprising an operation administration maintenance module comprising a memory.

According to another aspect, the invention provides a method, performed in a telecommunications network, for facilitating exchange of at least one information element between two base station modules of a communications apparatus, the method comprising exchanging at least one information element via transferring means for transferring said at least one information element via a communication node of said communication network external to said communication apparatus.

According to one aspect, the invention provides a method, performed in a telecommunications network, for facilitating exchange of at least one information element between two base station modules of the network, the method comprising exchanging at least one information element via transferring means for transferring said at least one information element via a communication node of said communication network, wherein the transferring means: generate and send a request identifying at least one required information element from a first base station module to a communication node of said communication network, receive said request from said communication node and send from a second base station module a response to said request comprising said requested at least one required information element; and receive said response in the first base station module.

Aspects of the invention extend to computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

BRIEF DESCRIPTION OF THE DRAWINGS

Embodiments of the invention will now be described, by way of example, with reference to the accompanying drawings, in which.

EXEMPLARY EMBODIMENTS

Although for efficiency of understanding for those of skill in the art, embodiments and implementations of the invention will be described in detail in the context of a 3G system (UMTS, LTE), the principles of the invention can be applied to other systems (such as WiMAX) in which mobile devices or User Equipment (UE) communicate with one of several base stations with the corresponding elements of the system changed as required.

Overview

Figure 1:
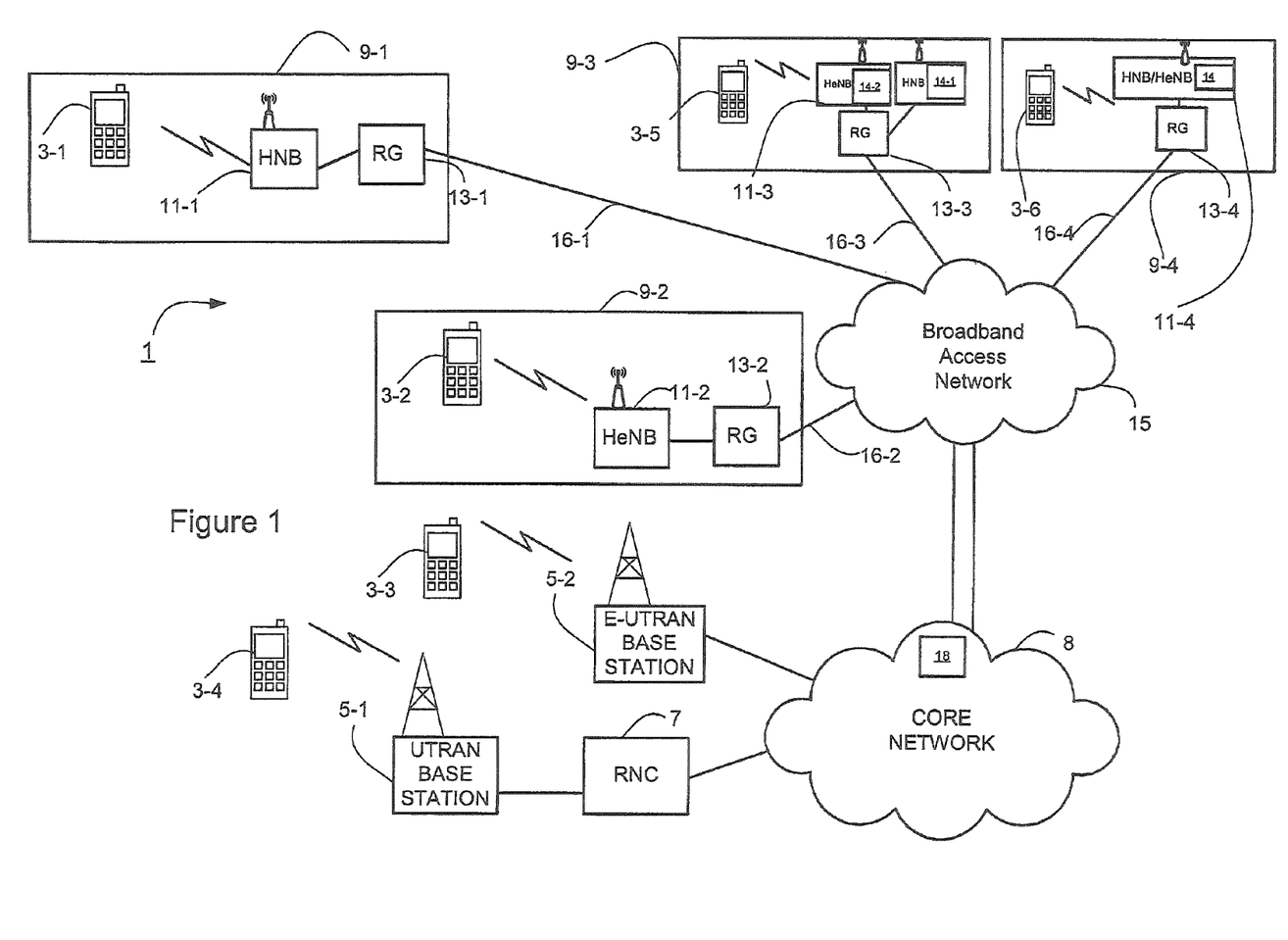
FIG. 1 schematically illustrates a mobile telecommunication system.

FIG. 1 schematically illustrates a mobile (cellular) telecommunication system 1 in which users of User Equipments (UE) such as mobile telephones 3-1 to 3-6 can communicate with other users via different access nodes. In particular, mobile telephones 3 (or other user equipment UE) can make connections with the mobile telephone core network 8 directly via a Universal Terrestrial Radio Access Network (UTRAN) base station 5-1 and associated Radio Network Controller (RNC) 7 or an evolved UTRAN (E-UTRAN) base station 5-2. Mobile telephones 3 can also connect to the mobile telephone core network 8 using a 'home' base station (HNB) provided in a user's commercial or private residence 9. Each HNB or HeNB 11 (i.e. HNB 11-1, HeNB 11-2, HNB/HeNB 11-3 and HNB/HeNB 11-4) is coupled, by a residential gateway 13 and a broadband access network 15 (conforming to the BroadBand Forum, BBF), to the mobile telephone core telephone network 8.

In the example illustrated in FIG. 1, the mobile telephone 3-1 is connected to the core network 8 via the HNB 11-1; the mobile telephone 3-2 is connected to the core network 8 via HeNB 11-2; the mobile telephone 3-3 is connected to the core network 8 via E-UTRAN base station 5-2; the mobile telephone 3-4 is connected to the core network 8 via UTRAN base station 5-1, the mobile telephone 3-5 is connected to the core network 8 via the dual mode base HNB/HeNB or dual femto access point 11-3; and the mobile telephone 3-6 is connected to the core network 8 via the dual mode base HNB/HeNB or dual FAP 11-4.

In the example of FIG. 1, the residential gateways 13 connect to the broadband access network 15 via an ADSL or cable connection 16 and the HNBs and HeNBs are programmed with the IP address of a security gateway (not shown) within the core network 8 so that the HNBs and HeNBs initially connect to the preprogrammed security gateway. In this embodiment, the residential gateway 13 of a user's commercial or private residence 9 assigns the HNB or HeNB 11 a local IP address in the broadband access network 15, which the HNB or HeNB 11 will use in its communications with the core network 8.

Advantageously, the HNB and HeNB of the dual FAP 11-3, 11-4 is provided with an information transfer portion 14 for transferring at least one information element from one of the first and second base station modules to the other one of the first and second base station modules. The transferring module 14 advantageously allows the exchange of information elements between the HNB and HeNB of the dual FAP. The HeNB and the HNB might use the information element exchanged via the information transfer portion 14 for its own operation, for instance for updating information and/or for informing a CSFB or Handover as to whether or not to transfer to the coexisting HNB/HeNB part of the dual FAP.

Home Base Station

Figure 2A:
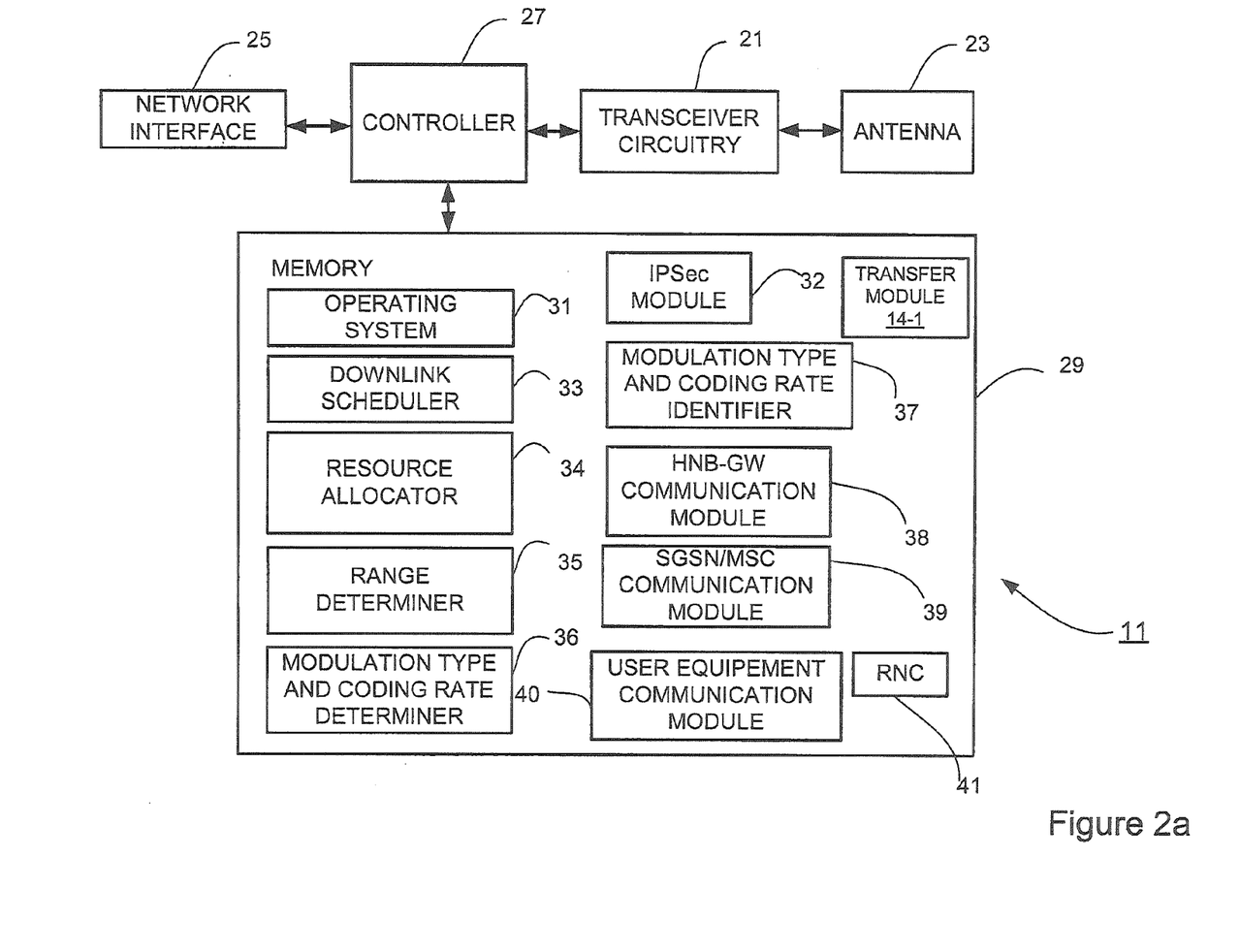
FIGS. 2a, 2b and 2c show a block diagram illustrating the main components of a base station, that is a home NodeB communications node in a 3G system.
Figure 2B:
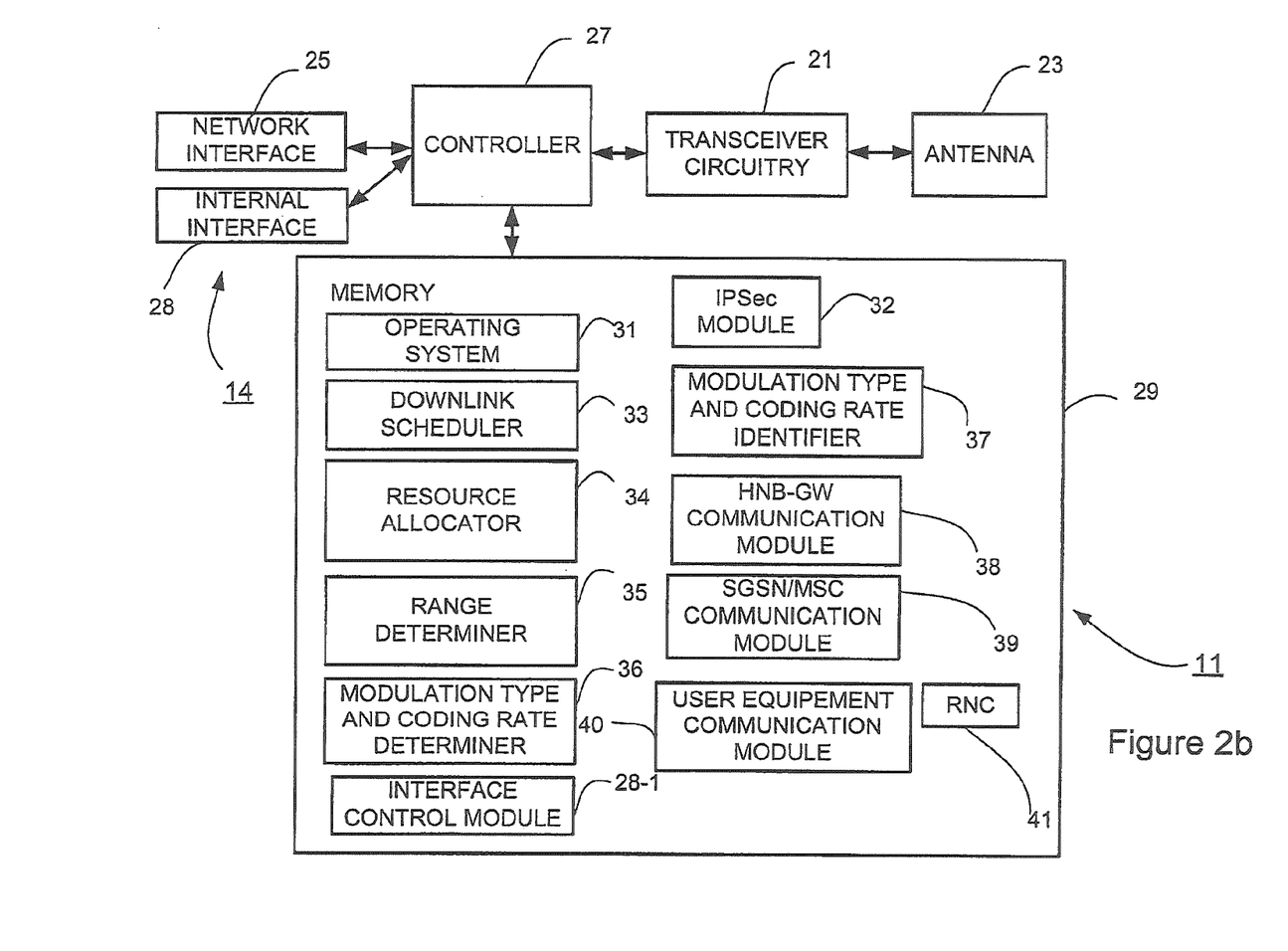
Figure 2C:
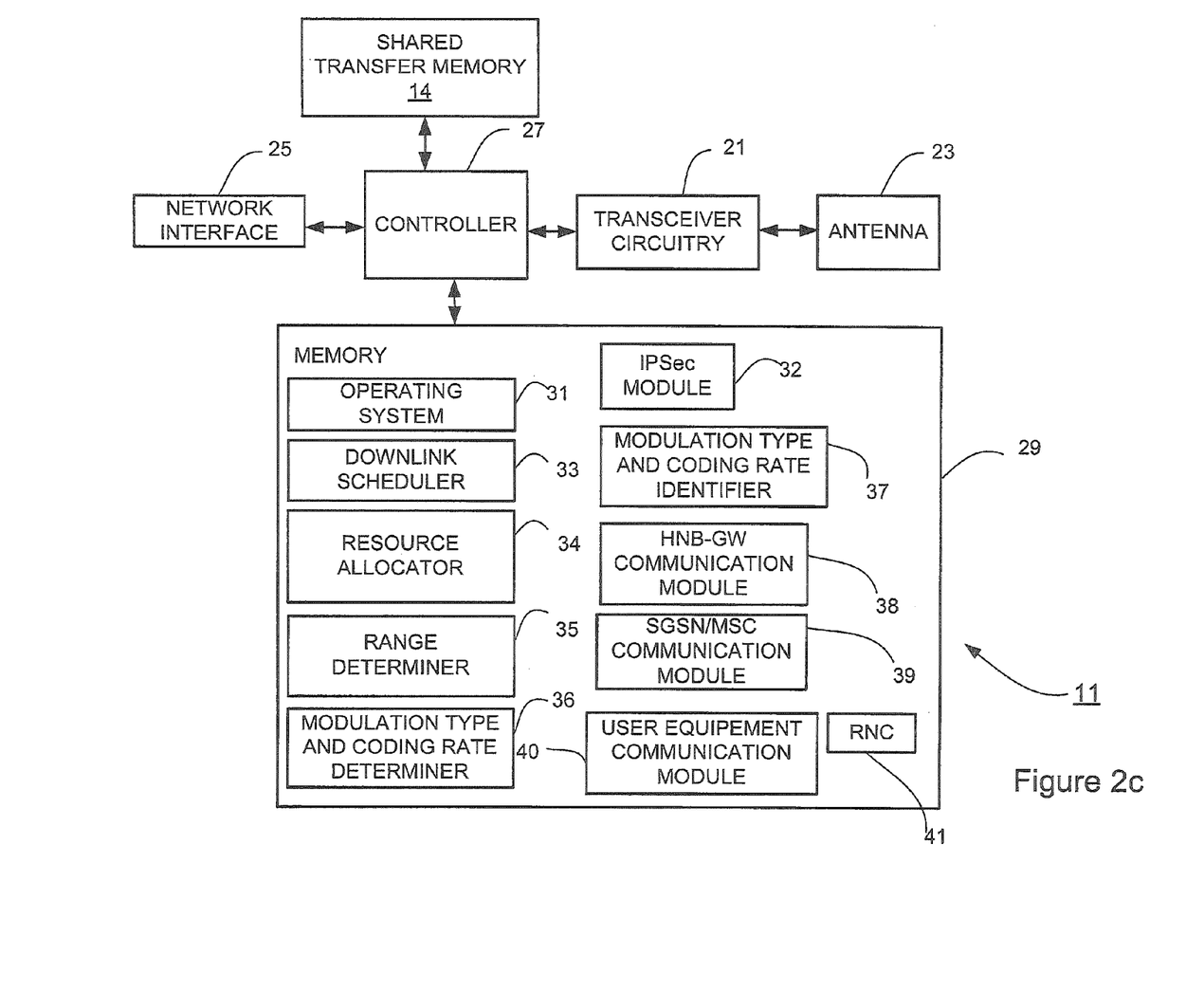

FIGS. 2a, 2b and 2c show block diagrams illustrating the main components of a different example of a HNB base station part of a dual FAP 11-3, 11-4 in the 3G system 1.

As shown in FIGS. 2a, 2b and 2c, each exemplary HNB part of the dual FAP comprises at least a transceiver circuit 21 to transmit signals to and to receive signals from the UEs 3 via one or more antennae 23 and to transmit signals to and to receive signals from the telephone network via a network interface 25. The transceiver circuit 21 is controlled by a controller 27 in accordance with software stored in memory 29. The software includes, among other things, an operating system 31, an IPSec module 32, a downlink scheduler 33 to schedule user data packets to be transmitted by the transceiver circuit 21 in communications with the UEs 3, a resource allocator 34 to allocate frequency resources for use by the UEs 3 for transmitting their uplink data to the base station. In this example, the software further includes a range determiner 35 to determine the range of a UE from the base station, a modulation type and coding rate (MCS) determiner 36 to determine the modulation and coding rate to be used, a modulation type and coding rate scheme (MCS) identifier 37 to identify to a UE 3 the MCS of a control channel upon which the base station is attempting to communicate with the UE 3, an HNB-GW communication module 38; an SGSN/MSC communication module 39, a user equipment communication module 40. The HNB 11 further includes radio resource management functions provided by a standard Radio Network Controller RNC 41.

As described above each exemplary HNB part also of the dual FAP 11-3, 11-4 includes a transfer portion 14 (comprising a transfer module referred to as 14-1 in FIG. 2a) configured for the exchange of information elements with the HeNB part of the FAP 11-3, 11-4.

The HNB part of FIG. 2a comprises a transfer portion comprising a transfer module 14-1 operable to exchange information with the HeNB part using an external transfer mechanism.

The HNB part of FIG. 2b comprises a transfer portion 14 comprising in internal 'HeNB' interface 28 for use in exchanging information with the HeNB part using an internal transfer mechanism under the control of an information transfer control module.

FIG. 2c comprises a transfer portion 14 comprising a shared transfer memory into which the HeNB part and HNB part may store information and from which the HeNB part and HNB part may retrieve information relating to the other part.

The operation of each transfer portion 14 is described in more detail later in the section entitled 'Operation'.

It will be appreciated that the HeNB part of the dual FAP 11-3 and 11-4 shown in FIG. 1 may have a similar configuration having corresponding components to any of the exemplary HNB parts shown in FIGS. 2a, 2b and 2c (including a transfer module or portion 14 for exchanging information with the HeNB part). The main differences between the HeNB part and the HNB part include the fact that the HNB-GW communication module 38 is optional and, instead of an SGSN/MSC communication module 39, there may be an MME communication module for communicating with an MME. Also, the HeNB do not communicate using the HNBAP protocol, but using the E-UTRAN protocols such as the S1AP protocol.

User Equipment

Figure 3:
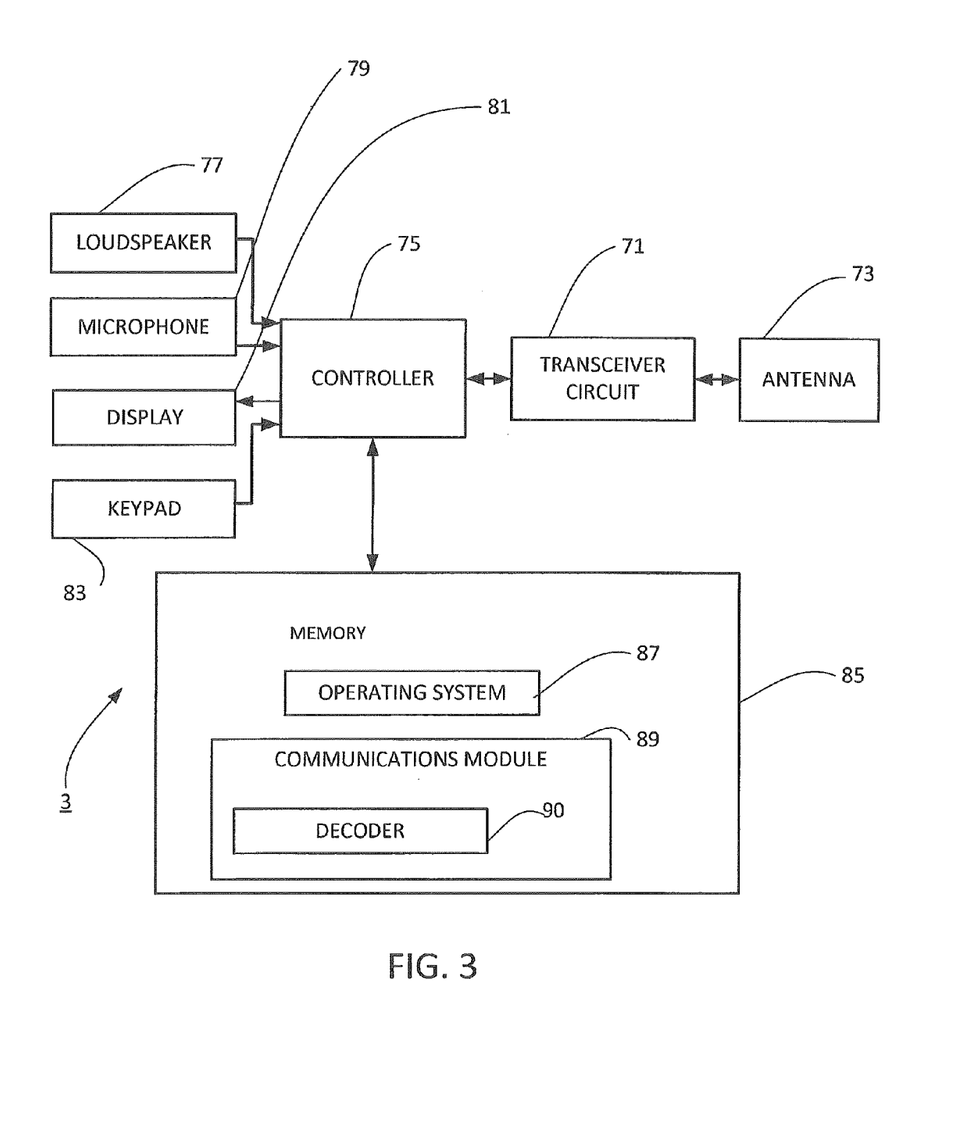
FIG. 3 illustrates schematically the main components of a UE of the telecommunication system of FIG. 1.

FIG. 3 illustrates schematically the main components of a UE 3 shown in FIG. 1. As shown in FIG. 3, each UE 3 includes a transceiver circuit 71 to transmit signals to and to receive signals from the base stations 5 or 11 via one or more antennae 73. As shown, the UE 3 also includes a controller 75 to control the operation of the UE 3. The controller 75 is connected to the transceiver circuit 71 and to a user interface having, in this example, a loudspeaker 77, a microphone 79, a display 81, and a keypad 83. The controller 75 operates in accordance with software instructions stored within memory 85. As shown, these software instructions include, among other things, an operating system 87 and a communications module 89 having a decoder 90 to perform decoding on a downlink (DL) control channel.

Dual FAP Architectures

Figure 4A:
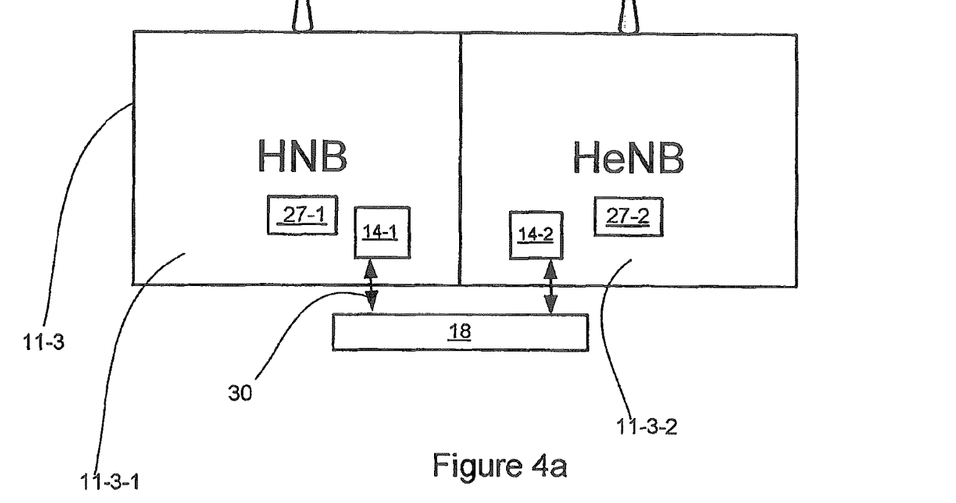
FIG. 4a schematically illustrates an example of an architecture for a dual mode FAP of the telecommunication system of FIG. 1.
Figure 4B:
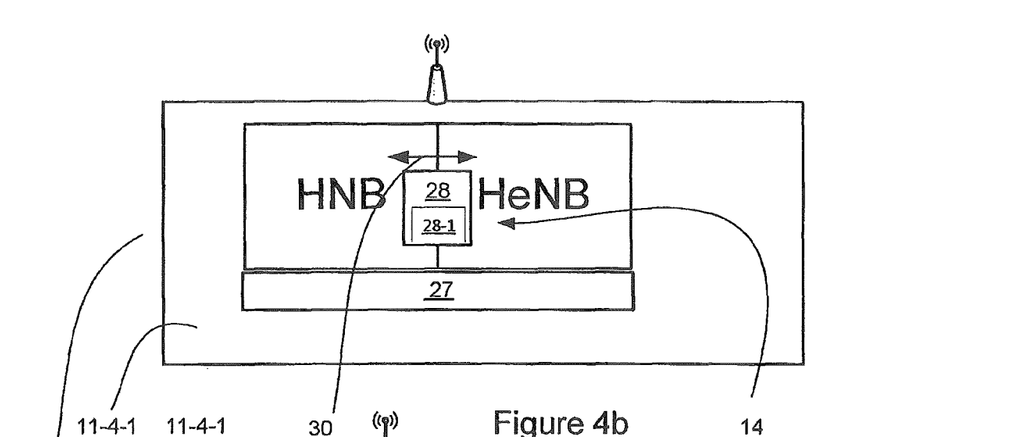
FIGS. 4b and 4c schematically illustrate another example of an architecture for a dual mode FAP of the telecommunication system of FIG. 1.
Figure 4C:
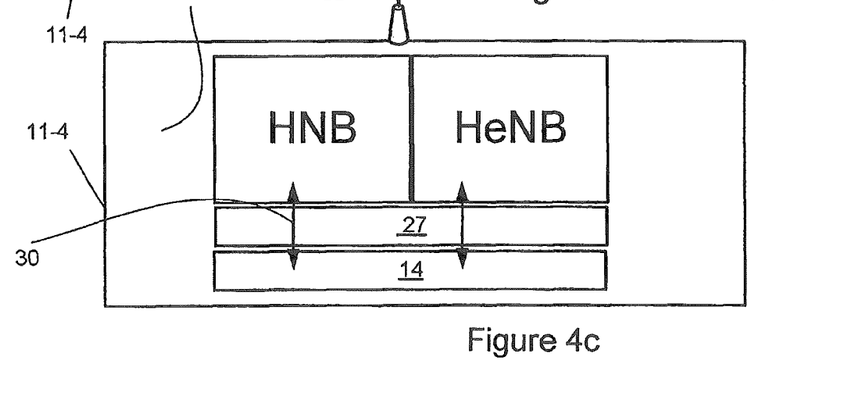

FIGS. 4a, 4b and 4c schematically illustrate different architectures for the dual FAP 11-3 and 11-4 of FIG. 1. The FAP of FIG. 4a comprises an HNB part and an HeNB part substantially as described with reference to FIG. 2a. The FAP of FIG. 4b comprises an HNB part and an HeNB part substantially as described with reference to FIG. 2b. The FAP of FIG. 4c comprises an HNB part and an HeNB part substantially as described with reference to FIG. 2c.

FIG. 4a schematically illustrates an example of an architecture for the dual FAP 11-3 of FIG. 1, where the dual FAP comprises separate controller modules 27-1 and 27-2, i.e. there is a controller module 27 for each of the HNB and the HeNB. In this example, each separate controller module 27-1 and 27-2 may be considered as part of separate baseband chipset 11-3-1 and 11-3-2 respectively.

FIGS. 4b and 4c schematically illustrate an example of an architecture for the dual FAP 11-4 of FIG. 1, where the dual FAP comprises a single controller module 27, i.e. there is a single controller module 27 for both the HNB and the HeNB. In this example, the controller module 27 can be considered as part of a single baseband chipset 11-4-1 for both the HNB and the HeNB.

In the case of FIG. 4a, the two home base stations (HNB and HeNB) of the dual FAP 11-3 comprise a transfer portion 14 comprising the transfer module 14-1 and 14-2 respectively. In the case of FIG. 4b, the two home base stations (HNB and HeNB) of the dual FAP 11-4 comprise a transfer portion 14 comprising the internal interface 28 between the HNB and HeNB and the associated interface control 28-1. In the case of FIG. 4c, the two home base stations (HNB and HeNB) of the dual FAP 11-4 comprise a transfer portion 14 comprising the shared transfer memory into which the HeNB part and HNB part may store information and from which the HeNB part and HNB part may retrieve information relating to the other part.

In FIGS. 4a, 4b and 4c, the first base station module and the second base station module are mounted within a common housing as shown by arrows 11-3 and 11-4.

Operation

Examples of methods used for transferring at least one information element from one of the first and second base station modules to the other one of the first and second base station modules of a dual FAP, will now be described. Although for efficiency of understanding for those skilled in the art, the invention will be described in detail in the context of two home base stations (HNB and HeNB) of a dual FAP, the principles described herein can be applied to a multimode FAP comprising more than two home base stations with the corresponding elements of the system changed as required.

In the FAP 11-3 described with reference to FIG. 4a and the HNB/HeNB parts described with reference to FIG. 2a, the transfer portion 14 for transferring information elements from one of the first and second base station modules to the other one of the first and second base station modules is operable to transfer information elements using an external mechanism, for example, via communication with another communications node 18 such as a Serving GPRS Support Node (SGSN), elsewhere in the communication network for instance in the core network 8.

Figure 5:
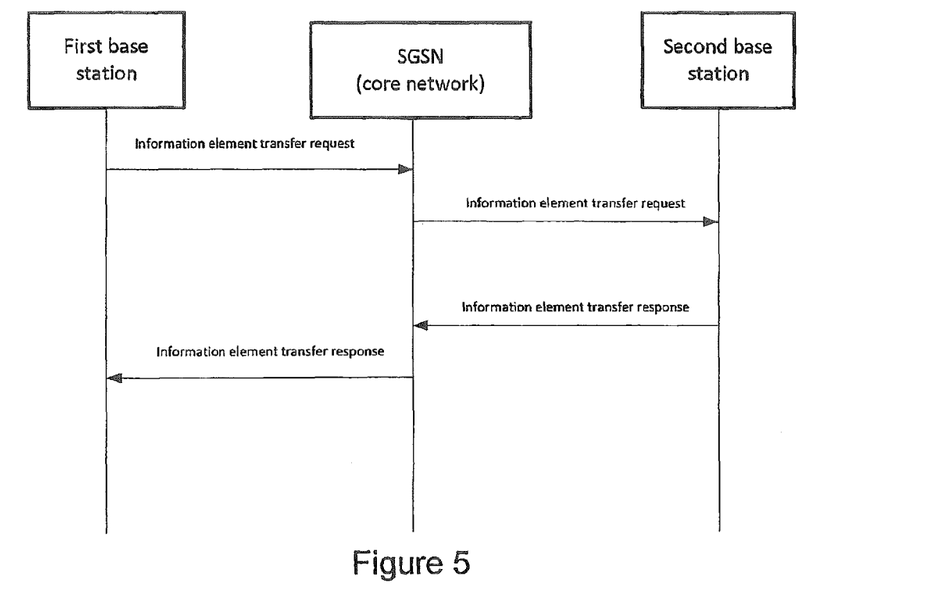
FIG. 5 is a timing diagram illustrating an exemplary method performed by the telecommunication system of FIG. 1.

Specifically, the FAP 11-3 described with reference to FIGS. 2a, 4a may employ an external transfer mechanism as illustrated, in simplified form, in FIG. 5. As seen in FIG. 5 a first home base station of the FAP 11-3 sends an information element transfer request to request at least one information element, via its respective transfer module 14-1, 14-2 to an external communication node 18 (in this case an SGSN). The external communication node 18 then transmits the information element transfer request sent to the second base station of the FAP 11-3 where the corresponding transferring module 14-2, 14-1 receives and interprets the request. The second base station then sends an information element transfer response containing the requested information element(s), in reply to the original transfer request, via its transfer module 14-2, 14-1 to the external communication node 18. The external communication node 18 then transmits the information element transfer response containing the requested information element(s) to the first home base station of the FAP 11-3 where the corresponding transfer module 14-1, 14-2 of the first base station receives and interprets the information element transfer response.

In this example, the first and second base station modules are advantageously configured to perform the external transfer using a Self Organizing Network (SON) Transfer protocol as defined in 3GPP TS 36.413 V10.3.0 and TS 48.018 V10.3.0. In accordance with the SON transfer protocol, the information elements which may be transferred from one base station module to another base station module of a dual FAP 11 are added to a SON Information Transfer message, as any one of:

a SON Transfer Application Identity information element, or a SON Transfer Request Container information element, or a SON Transfer Response Container information element.

In each FAP 11 described with reference to FIGS. 4b and 4c and the HNB/HeNB parts described with reference to FIGS. 2b and 2c, the transfer portion 14 for transferring information elements from one of the home base station parts to the other one of home base station parts uses an internal mechanism to transfer the information elements. Both the HeNB and the HNB of the dual FAP 11 are able to exchange, as shown by arrows 30, and interpret the information elements transferred by the transferring module or portion 14.

The FAP 11 described with reference to FIGS. 2b, 4b employs an internal transfer mechanism as illustrated, in simplified form, in FIG. 6. As described with reference to FIG. 2b, the transfer portion 14 comprises an internal interface 28 for coupling one home base station part with the other home base station part.

Figure 6:
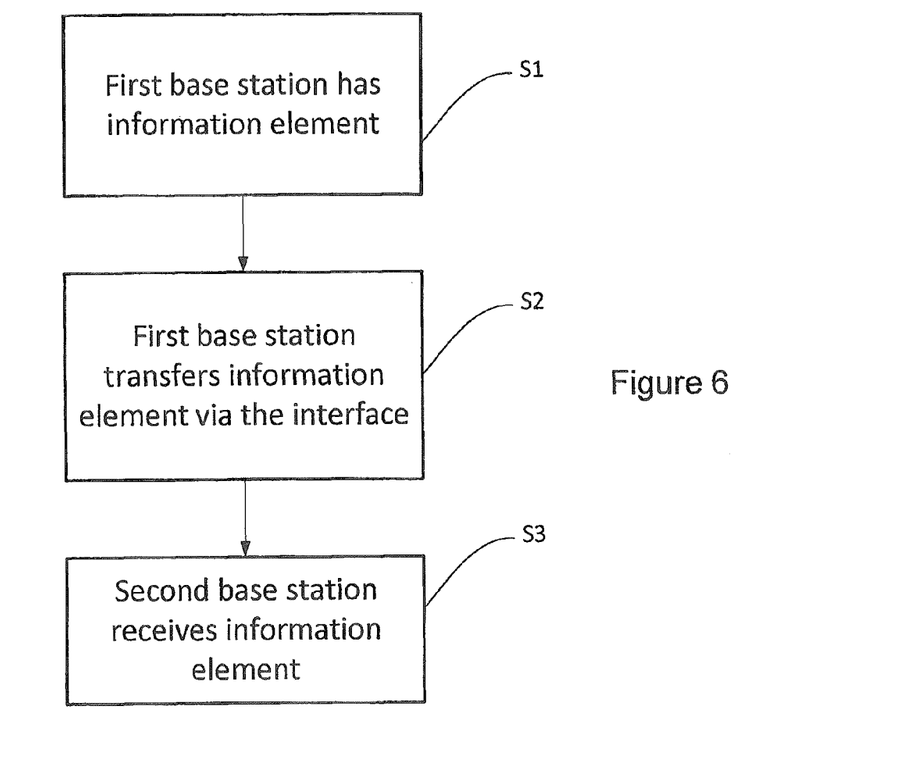
FIG. 6 is a diagram illustrating another an exemplary method performed by the telecommunication system of FIG. 1.

As seen in FIG. 6, in this example, a first of the home base station parts has, in S1, at least one information element which may be needed by a second coexisting home base station part. The first home base station part provides, in S2, the at least one information element to the coexisting second home base station part via the internal interface 28 under the control of the interface controller module 28-1, in response to an indication that the information elements are required. The indication may comprise an explicit request from the second home base station part to request the information represented by the information element(s), may comprise an external impetus from another communication node to request that the first home base station part provides the information, or may comprise an internal indication from one of the modules of the first home base station part, for example, in response to a predetermined condition being reached. For example, a congestion status or other load related information element(s) may be provided to the second home base station, by the first home base station part, in response to an explicit request from the second base station, or may be provided when a predetermined congestion threshold has been reached so that the second home base station part can avoid handing a device over to the first home base station part when insufficient resources are available. In S3 the second home base station receives the information element as a result of the transfer.

Figure 7:
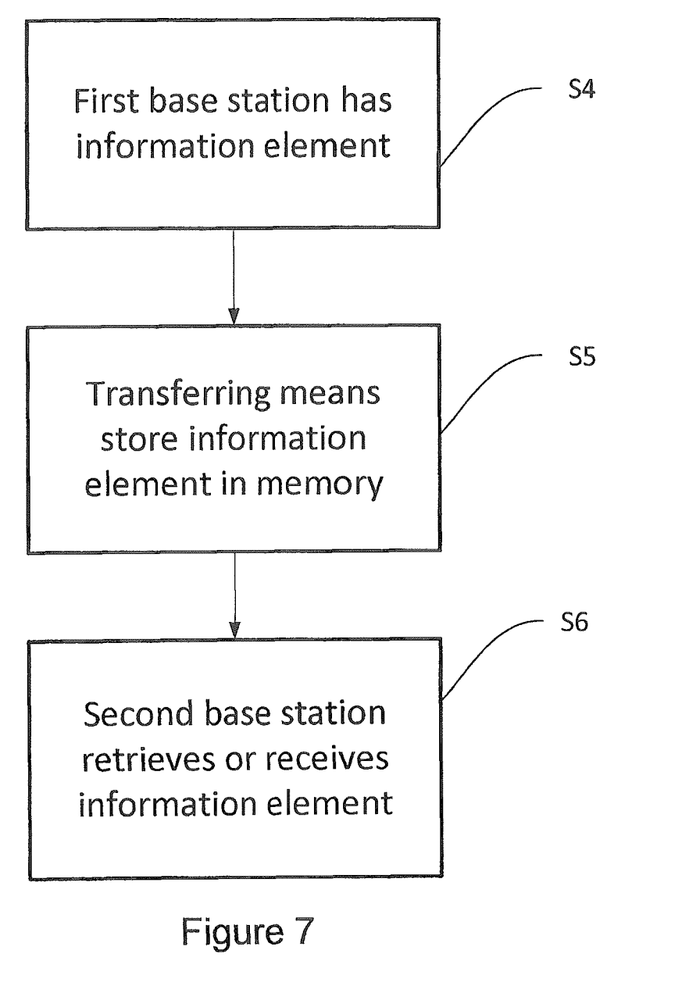
FIG. 7 is a diagram illustrating yet another an exemplary method performed by the telecommunication system of FIG. 1.

The FAP 11 described with reference to FIGS. 2c and 4c employs a transfer portion 14 comprising a shared transfer memory as described previously and a transfer mechanism as illustrated, in simplified form, in FIG. 7. As seen in FIG. 7, a first of the home base station parts has, in S4, at least one information element which may be needed by a second coexisting home base station part. The first home base station part stores the information element(s), in S5, in the shared transfer memory. The second home base station part retrieves, from the shared transfer memory, in S6 any stored information element required. The shared transfer memory advantageously forms part of an operation administration maintenance (OAM) module comprising the shared memory.

Advantageously, the provision of the shared transfer memory allows information elements representing an initial configuration of the HNB and the HeNB by an Auto Configuration Server (ACS) (e.g. an ACS according to technical report TR-069 of the Broadband Forum) to be stored in the shared transfer memory associated with the operation administration maintenance (OAM) module. As described above, the information elements representing the initial configuration can therefore be retrieved by the HNB and/or the HeNB or provided to the HNB and/or the HeNB by the OAM module using an appropriate message.

Advantageously, in each of the examples described above, the home base station parts are configured for the transfer of information elements associated with or comprising any of the following:

a configuration of at least one of the first and second base station modules, a Physical Cell Identifier (PCI), a Primary Scrambling Code (PSC), a carrier frequency, a static parameter information element, for instance a static cell parameter information element, a dynamic parameter information element, for instance a dynamic cell parameter information element, System Information such as UMTS system information for the HNB part, and a neighbour cell list.

The static parameter information element comprises at least one of:

a maximum number of UE that a base station module is configured to serve (MaxUEsServed), a maximum number of closed subscriber group (CSG) members that a base station module is configured to serve (MaxCSGMembers), a maximum number of non CSG members that a base station module is configured to serve (MaxNonCSGMembers).

The dynamic parameter information element comprises at least one of:

a current number of CSG UE which are being served by a base station module, a current number of non CSG UE which are being served by a base station module, and a load/congestion status of a base station module.

The transfer mechanisms described are particularly advantageous in a number of situations.

Beneficially, by providing for the PCI/PSC and/or carrier frequency to be obtained from a coexisting home base station function using an internal or external transfer mechanism, if one home base station part (e.g the HeNB) reselects/changes its PCI/PSC and/or carrier frequency dynamically, the other part (e.g. the HNB) can obtain the information without having to wait for the NMM to be performed (resulting in the HNB having the wrong data stored in its neighbour cell information related to HeNB). Similarly, by providing for the configuration information provided by the ACS for a coexisting home base station part to be obtained from a coexisting home base station function using an internal or external transfer mechanism, the configuration information can be obtained promptly without having to wait for the ACS to provide it. This is particularly advantageous, for example, because handover to the HeNB may fail or may not occur when it should if the wrong parameters (e.g. PCI/Carrier Frequency) are stored at the HNB.

Moreover, by providing for neighbour cell information to be obtained from a coexisting home base station function using an internal or external transfer mechanism, if the NMM is operated at a different time by the HNB than the HeNB, or if the HeNB identifies a greater number of neighbours than HNB by virtue of an automatic neighbour (ANR) procedure, the neighbour cell information can advantageously be synchronised between the HNB and HeNB to avoid the HNB and HeNB having different neighbour cell information to one another.

Beneficially, by providing for UMTS System Information for HNB to be obtained from a coexisting home base station function using an internal or external (SON based) transfer mechanism, if one home base station part (e.g. the HeNB) needs to perform a circuit switched fallback (CSFB) procedure (e.g. as defined in 3GPP TS 36.300), via redirection to the HNB, the HeNB does not need to retrieve this information using the current signaling intensive Radio Access Network (RAN) Information Management (RIM) procedure via the core network 8. Accordingly, traffic towards the core network 8 can be reduced.

Beneficially, by providing for the static parameters such as MaxUEsServed, and dynamic parameters such as current CSG UEs, and congestion/load status to be obtained from a coexisting home base station function, using an internal or external (SON based) transfer mechanism, potential handover failure can be detected early thereby allowing unnecessary handover signaling associated with a failed handover attempt to be avoided.

For example, even if the NMM is not performed by a particular home base station part to monitor immediately the reselection and change of at least one of the PCI, PSC and carrier frequency by the other base station module of the dual FAP or even if the TR-069 ACS and the NMM module do not send immediately updated information elements to at least one of the base station module as regards to the NMM results, the information element corresponding to the updated PCI, PSC, the carrier frequency and the Neighbour Cell List may be transmitted to the base station module. Both the base stations therefore may have updated information elements as regards to at least one of the PCI, PSC and carrier frequency of the other base station module of the dual FAP and the PCI, PSC and carrier frequency of neighbour base station modules. In the example of a handover, the source base station module may have access to the information element about the static parameter information element and the dynamic parameter information element of the target base station module, to make a decision about initiating a handover. This results in a more efficient decision for initiating a handover, a more successful handover procedure, and a reduction in unnecessary signalling over the communications network.

Modifications and Alternatives

Detailed embodiments have been described above. As those skilled in the art will appreciate, a number of modifications and alternatives can be made to the above embodiments whilst still benefiting from the inventions embodied therein.

In the above embodiments, a mobile telephone based telecommunications system was described. As those skilled in the art will appreciate, the signalling techniques described in the present application can be employed in other communications systems. Other communications nodes or devices may include user devices such as, for example, personal digital assistants, laptop computers, web browsers, etc.

In the embodiments described above, the mobile telephone and the HNB or HeNB each include transceiver circuitry. Typically this circuitry will be formed by dedicated hardware circuits. However, in some embodiments, part of the transceiver circuitry may be implemented as software run by the corresponding controller.

It should of course be appreciated that, although not explicitly shown in FIGS. 2a, 2b, 2c, 3 and 4a, 4b, and 4c the base stations 11 and UEs 3 will have all of the functionality necessary to enable them to operate as base stations and UEs, respectively, in the particular system in which they are designed to function. It should also be appreciated that FIGS. 2a, 2b, 2c, 3 and 4a, 4b, and 4c are functional block diagrams and that in practice the individual blocks shown in FIGS. 2a, 2b, 2c, 3 and 4a, 4b, and 4c may exist as discrete elements or their functionality may be distributed or not individually discernable. As an example, the modules 31 to 41 may or may not be separate software modules.

Although the above description of FIGS. 2a, 2b, 2c, 3 and 4a, 4b, and 4c indicates that the described functionality is provided by software, it should be appreciated that the functionality of a UE or base station may be provided, where appropriate, by hardware, software, firmware or any combination thereof. As an example, the functionality performed by part or all of the above-described software may be performed using one or more dedicated hardware circuits. A software implementation may however be preferred to facilitate the updating of the functionality of a base station 11 or UE 3.

Where software modules are provided, they may be provided, as appropriate, in compiled or un-compiled form and may be supplied to the base station or to the UE, as the case may be, as a signal over a computer or telecommunications network, or on a computer storage medium such as for instance a CD ROM.

Various other modifications will be apparent to those skilled in the art and will not be described in further detail here.

For instance, the base stations of the multimode femto access point might implement any of the example alone or any combination of the examples, depending on the circumstances and the conditions.

Although the invention has been described with particular reference to embodiments comprising the transfer of at least one information element between the HNB/HeNB parts of a dual FAP, the invention may also be beneficially employed in embodiments comprising the transfer of an information element between two macro cells or between a femto cell and a macro cell.

The invention therefore also relates to the transfer of information element between an evolved UTRAN (E-UTRAN) base station and a Universal Terrestrial Radio Access Network (UTRAN) base station or between a home base station (HeNB or HNB) and a macro cell (E-UTRAN or UTRAN).

Beneficially and as a non limiting example, by providing for instance the PCI/PSC and/or carrier frequency by a mechanism according to aspects of the invention, if one base station (e.g. a HeNB or an E-UTRAN) reselects/changes its PCI/PSC and/or carrier frequency dynamically, the other base station (e.g. a HNB or a UTRAN respectively) can obtain the information promptly. The transfer may be an external mechanism, for example, via communication with another communications node such as a Serving GPRS Support Node (SGSN), elsewhere in the communication network for instance in the core network. This is particularly advantageous, for example, because handover to the HeNB may fail or may not occur when it should if the wrong parameters (e.g. PCI/Carrier Frequency) are stored at the HNB.

This application is based upon and claims the benefit of priority from United Kingdom patent application No. 1120963.2, filed on Dec. 6, 2011, the disclosure of which is incorporated herein in its entirety by reference.

The invention claimed is:

1. A dual mode femto access point, comprising:
a first base station module comprising a home base station (HNB) operating in accordance with 3G standard, the first base station module being configured to provide wireless connectivity to a communications network to one or more mobile communications devices;
a second base station module comprising a home base station (HeNB) operating in accordance with LTE standard, the second base station module being configured to provide wireless connectivity to a communications network to one or more mobile communications devices; and
a transceiver configured to transfer, internally to said dual mode femto access point, at least one information element from one of the first base station module and the second base station module to an other one of the first base station module and the second base station module,
wherein the transceiver comprises an internal interface that couples the first base station module and the second base station module,
wherein the internal interface comprises an interface module which comprises at least one controller module for at least one of the first base station module and the second base station module, and
wherein at least one of the first base station module and the second base station module is configured to provide at least one information element to the other one of the first base station module and the second base station module via the internal interface, in response to a request from the controller module.

2. A dual mode femto access point according to claim 1, wherein at least one of the first base station module and the second base station module is configured to provide at least one information element to the transceiver,
wherein the transceiver comprises a memory to store the provided at least one information element, and
wherein the other of the first base station module and the second base station module is configured to retrieve the provided at least one information element from the memory of the transceiver.

3. A dual mode femto access point according to claim 1, wherein at least one of the base station module and the second base station module is configured to provide at least one information element to the transceiver,
wherein the transceiver comprises a memory to store the provided at least one information element, and
wherein the transceiver is configured to provide the information element provided by the at least one of the first base station module and the second base station module to the other of the first base station module and the second base station module.

4. A dual mode femto access point according to claim 1, wherein the transceiver comprises an operation administration maintenance module comprising a memory.

5. A dual mode femto access point according to claim 1, wherein the at least one information element comprises at least one of:
a configuration of at least one of the first base station module and the second base station module,
a Physical Cell Identifier (PCI),
a Primary Scrambling Code (PSC),
a carrier frequency,
a static parameter information element,
a dynamic parameter information element,
System Information, such as UMTS system information, and
a neighbour cell list.

6. A dual mode femto access point according to claim 5, wherein the static parameter information element comprises at least one of:
a maximum number of UE that a base station module is configured to serve (MaxUEsServed),
a maximum number of closed subscriber group (CSG) members that a base station module is configured to serve (MaxCSGMembers),
a maximum number of non CSG members that a base station module is configured to serve (MaxNonCSGMembers), and
wherein the dynamic parameter information element comprises at least one of:
a current number of CSG UE which are being served by a base station module,
a current number of non CSG UE which are being served by a base station module, and
a load or congestion status of a base station module.

7. A dual mode femto access point according to claim 1, wherein the first base station module and the second base station module are mounted within a common housing.

8. A system for use in a telecommunications network, comprising one or more mobile communications devices and a dual mode femto access point according to claim 1.

9. A mobile communications device for use with a dual mode femto access point, wherein the dual mode femto access point comprises:
a first base station module comprising a home base station (HNB) operating in accordance with 3G standard, the first base station module being configured to provide wireless connectivity to a communications network to one or more mobile communications devices;
a second base station module comprising a home base station (HeNB) operating in accordance with LTE standard, the second base station module being configured to provide wireless connectivity to a communications network to one or more mobile communications devices; and
an internal interface that couples the first base station module and the second base station module,
wherein at least one of the first base station module and the second base station module is configured to exchange, internally to said dual mode femto access point, at least one information element with an other one of the first base station module and the second base station module via said internal interface,
wherein the internal interface comprises an interface module which comprises at least one controller module for at least one of the first base station module and the second base station module, wherein at least one of the first base station module and the second base station module is configured to provide at least one information element to the other one of the first base station module and the second base station module via the internal interface, in response to a request from the controller module, and wherein the mobile communications device is arranged to communicate in a communications network via one of the first base station module and the second base station module of the dual mode femto access point.

10. A method, performed in a telecommunications network, for facilitating exchange of at least one information element between two base station modules of a dual mode femto access point that comprise a base station module comprising a home base station (HNB) operating in accordance with 3G standard and another base station module comprising a home base station (HeNB) operating in accordance with LTE standard, the method comprising exchanging at least one information element, over an internal interface coupling the two base station modules, wherein the internal interface comprises an interface module which comprises at least one controller module for at least one of the two base station modules, and wherein at least one of the two base station modules is configured to provide at least one information element to an other one of the two base station modules via the internal interface, in response to a request from the controller module.

11. A non-transitory computer readable medium comprising instructions for carrying out a method according to claim 10.

12. A method, performed in a telecommunications network, for facilitating exchange of at least one information element between two base station modules of a dual mode femto access point that comprise a base station module comprising a home base station (HNB) operating in accordance with 3G standard and another base station module comprising a home base station (HeNB) operating in accordance with LTE standard, the method comprising exchanging at least one information element via a transceiver comprising an operation administration maintenance module comprising a memory, wherein the transceiver comprises an internal interface that couples the two base station modules, wherein the internal interface comprises an interface module which comprises at least one controller module for at least one of the two base station modules, and wherein at least one of the two base station modules is configured to provide at least one information element to an other one of the two base station modules via the internal interface, in response to a request from the controller module.

* * * * *